(12) United States Patent
Bourges-Waldegg et al.

(10) Patent No.: US 8,271,424 B2
(45) Date of Patent: Sep. 18, 2012

(54) PRIVACY AND CONFIDENTIALITY PRESERVING REPORTING OF URLS

(75) Inventors: Daniela Bourges-Waldegg, Rueschlikon (CH); Christian Hoertnagl, Kilchberg (CH); James F. Riordan, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 1161 days.

(21) Appl. No.: 12/120,735

(22) Filed: May 15, 2008

(65) Prior Publication Data

US 2009/0287706 A1    Nov. 19, 2009

(51) Int. Cl.
*G06F 17/30* (2006.01)
(52) U.S. Cl. ............ 707/9; 707/102; 707/747; 707/748; 380/277; 380/280; 713/185; 713/186; 713/189
(58) Field of Classification Search ............. 707/9, 102, 707/747–748; 380/277–280; 713/185–189
See application file for complete search history.

(56) References Cited

U.S. PATENT DOCUMENTS

| | | | |
|---|---|---|---|
| 7,430,670 B1* | 9/2008 | Horning et al. | 713/190 |
| 7,784,092 B2* | 8/2010 | Pearson et al. | 726/8 |
| 7,831,995 B2* | 11/2010 | Futoransky et al. | 726/1 |
| 7,846,023 B2* | 12/2010 | Evans et al. | 463/42 |
| 7,890,996 B1* | 2/2011 | Chauhan et al. | 726/13 |
| 7,953,731 B2* | 5/2011 | Patel et al. | 707/723 |
| 2003/0037248 A1* | 2/2003 | Launchbury et al. | 713/193 |
| 2003/0204490 A1* | 10/2003 | Kasriel | 707/2 |
| 2005/0022204 A1* | 1/2005 | Kabir et al. | 718/108 |
| 2006/0143041 A1* | 6/2006 | Tipirneni | 705/2 |
| 2007/0136607 A1* | 6/2007 | Launchbury et al. | 713/190 |
| 2007/0294339 A1* | 12/2007 | Ala-Kleemola et al. | 709/203 |
| 2008/0270111 A1* | 10/2008 | Hanumanthappa | 704/3 |
| 2009/0094677 A1* | 4/2009 | Pietraszek et al. | 726/2 |
| 2009/0119194 A1* | 5/2009 | Chau et al. | 705/35 |

OTHER PUBLICATIONS

Vaibhav Mehta, Ranking Attack Graphs, May 2006, Computer Science, 4219/2006, pp. 130-140.*

* cited by examiner

*Primary Examiner* — Nathan Flynn
*Assistant Examiner* — Viral Lakhia
(74) *Attorney, Agent, or Firm* — Cantor Colburn LLP; Daniel Morris

(57) ABSTRACT

A method of preserving privacy and confidentiality in a system where information is associated with an existing web page having an address. The method includes receiving a store command from a first user system, the store command including at least a database key and information to be associated with the web page, wherein the database key was created by performing a cryptographic hash function on the address of the web page; storing the information at a location in a storage database; associating the location with the database key; receiving a retrieve command from a second user system, the retrieve command including the database key calculated by the second user system; retrieving stored information from one or more locations in the database associated with the database key; and transmitting the stored information to the second user system.

9 Claims, 2 Drawing Sheets

PRIVACY AND CONFIDENTIALITY PRESERVING REPORTING OF URLS

BACKGROUND

The present invention relates generally to Internet usage and, more particularly, to preserving privacy and confidentiality when reporting Internet URLs.

Many Web 2.0 applications at some point report to a third party server the universal resource locators (URLs) of web pages that users visit. In particular, a subclass of applications use the URL as a database key to store metadata associated to the resource that may be produced in a variety of ways—by users themselves or by application-specific algorithms. When a user requests a URL, a browser extension or a web widget (i.e. a piece of code embedded in the web page) also contacts a server asking for this associated metadata, which is then displayed to the user or used to modify the user experience. Examples of these services are social annotations (e.g. diigo) and PageRank reporting (part of the Google toolbar). In the former example, the metadata (annotations) is produced by users and is intended to be shared among them; in the latter case, the metadata (the PageRank) is produced by Google's algorithms.

To illustrate how such systems may operate, the operation of an online web page annotation application is described below. The application allows users, on the one hand, to annotate any web page on the web—that is, to associate to (parts of) the web page comments, descriptions, observations, assessments, etc. On the other hand, it allows (possibly different) users to browse web pages and at the same time retrieve all associated annotations, displaying them e.g. by overlaying them onto the original web page. In this way and in a typical web 2.0 spirit, a common base of annotations is created such that users may benefit from each others' annotation efforts.

The application consists of a server part for storing the annotations and two client parts embedded in a browser (as browser extensions or web widgets): one for creating the annotations and one for retrieving and viewing existing annotations. Such an application may operate as follows: A first user who wishes to annotate a particular page having a particular URL loads the page into his browser. The first user then utilizes the browser extension or web widget for creating an annotation and submits the annotation to a server configured to store the annotations. The submission may be in the form [U, context, annotation] where U is the URL for the web page, context contains a permalink to the exact version of the web page and a fragment identifier, and annotation is the annotation provided by the first user. In more detail, "context" as the term is used herein, refers to information necessary for re-displaying the annotation in the same conditions as it was created—such as the URL for the exact version of the webpage (permalink) and the refining of a web page into a particular location on the web page (fragment identifier). For instance, if a web page includes six paragraphs, the context may point to a particular one of the paragraphs on the web page, which the annotation refers to.

The server that stores the annotation may then store the annotations under a database key that is the same as the URL for the page to which the annotations apply. At a later time, a second user (which may be the same user as the first user or a different user) loads the web page having the URL U and, utilizing a browser extension or web widget, contacts the server to retrieve the annotations associated with the web page. Using the URL for the web page as the key into the database, the server locates the annotations associated with the web page and transmits them to the requester. The annotations, including their contexts are received by the requester and then displayed on the web page at the indicated context.

The previous example illustrates how privacy and confidentiality of both the first and second users are being compromised. Because both the first and second user had to identify to the server the particular web page they were browsing in order to either store or retrieve the annotations, the server may create a record of the web pages visited for each user; recording the user's browsing history violates user privacy. In addition, such URLs themselves may contain confidential information if they belong to intranet resources, and thus confidentiality may be violated as well. In short, using URL's as a key to database gives away too much information to the server and may result in privacy and confidentiality concerns.

There exists a need, therefore, to allow for all of the functionality of systems as described above without revealing the URL of particular web pages viewed by users.

SUMMARY

One embodiment of the present invention is directed to a method of preserving privacy and confidentiality in a system where information is associated with an existing web page having an address. The method includes, in one embodiment, receiving a store command from a first user system, the store command including at least a database key and information to be associated with the web page, wherein the database key was created by performing a cryptographic hash function on the address of the web page; storing the information at a location in a storage database; associating the location with the database key; receiving a retrieve command from a second user system, the retrieve command including the database key calculated by the second user system; retrieving stored information from one or more locations in the database associated with the database key; and transmitting the stored information to the second user system.

Another embodiment of the present invention is directed to a method of securely providing annotations to a web page. The method of this embodiment includes providing a submission application to a first user system; providing a receiving application to a second user system; receiving a store command from the first user system, the store command including at least a store database key and information to be associated with the web page, wherein the store database key was created by performing a cryptographic hash function on the address of the web page; storing the information at a location in a storage database; associating the location with the store database key; receiving a retrieve command from a second user system, the retrieve command including the retrieve database key created by the receiving application, the retrieve database key being the same as the store database key; retrieving stored information from one or more locations in the database associated with the retrieve database key; and transmitting the stored information to the second user system.

Another embodiment of the present invention is directed to a method of retrieving information associated with a web page having an address. The method of this embodiment includes loading the web page; creating a database key based on the address; transmitting a retrieve command to a server; receiving reply from the server, the reply including a list of tuples and associated annotations, each tuple including a transformation of the address of a web page; determining that the transformation in one of the tuples equals a local transformation of the current web page address; and displaying the web page and the annotations associated to the identified tuple.

BRIEF DESCRIPTION OF THE DRAWINGS

Referring to the exemplary drawings wherein like elements are numbered alike in the several Figures.

DETAILED DESCRIPTION

Disclosed herein are methods that allow for metadata to be associated with a particular web page and stored on a server without identifying the URL of the web page to the server. In some embodiments, this is accomplished by performing a cryptographic hash function on the URL and using the result (or part of the result as the key into a database on a server containing metadata related to the URL. In one embodiment, the metadata may be annotations to the web page. The following description will focus on the annotation of web pages but the present invention is not limited to annotation applications and may be applied wherever URL's may be used as a key into a database of information related to a particular web page.

Figure 1:
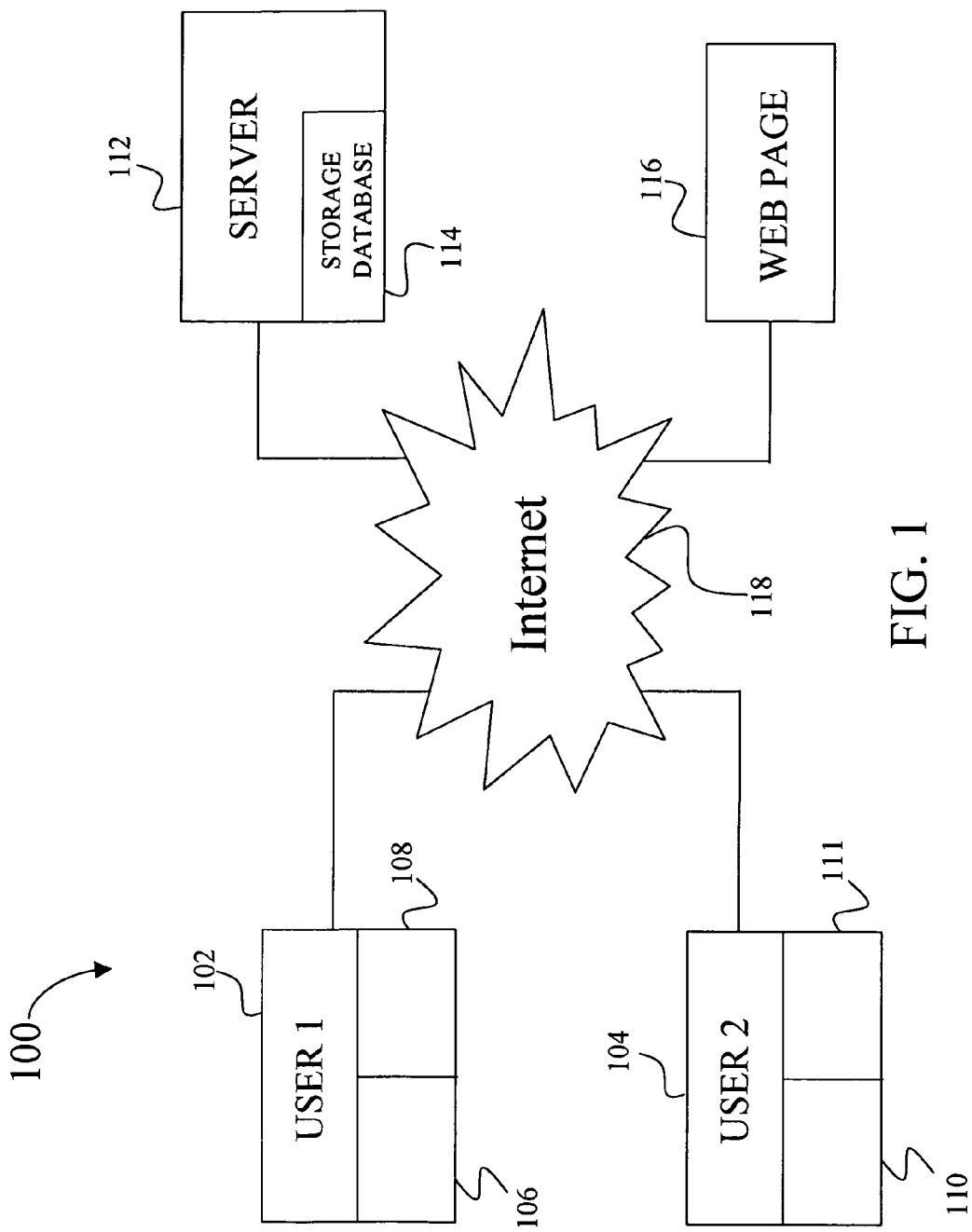
FIG. 1 is a system according to an embodiment of the present invention.

FIG. 1 depicts a system 100 according to an embodiment of the present invention. The system includes first and second user systems 102 and 104, respectively. Each user system 102 and 104 may be implemented using a general-purpose computer executing a computer program for carrying out the processes described herein. The user system 102 may be a personal computer (e.g., a lap top, a personal digital assistant) or a host attached terminal. Of course, the system 100 could include many more user systems and is not limited to two user systems. Each user system includes a submission application and receiving application. For example, a first user system 102 may include a first submission application 106 and a first receiving application 108 and the second user system 104 may include a second submission application 110 and second receiving application 111. In one embodiment, the first submission application 106 and the second submission application 110 may be the same application and the first receiving application 108 and the second receiving application 112 may be the same application. In some embodiments, the receiving applications and submission applications may be part of single application. In some embodiments, the receiving applications and submission applications may be implemented as browser extensions or code embedded in the web page (the latter may be referred to herein as "widgets"). As discussed in greater detail below, the submission applications 106 and 110 may, for example, convert a web page URL to be used as a key into a database into another format to mask which URL any associated information is related to. Likewise, the receiving applications may receive information from third-party server and be able to associate that information to a web page that the information may be related to.

The first and second user systems 102 and 104, respectively, are coupled to each other and a server 112 via a communications network 118. The communications network 118 may be any type of known network including, but not limited to, a wide area network (WAN), a public switched telephone network (PSTN) a local area network (LAN), a global network (e.g. Internet), a virtual private network (VPN), and an intranet. The communications network 118 may be implemented using a wireless network or any kind of physical network implementation known in the art. User systems 102 and 104 may be coupled to the server 106 through multiple networks (e.g., intranet and Internet) so that not all user systems are coupled to the host systems 104 through the same network. One or more user systems and the server 112 may be connected to the network 118 in a wireless fashion. In addition, the communications network 118 may connect the user systems 102 and 104 to a web server hosting a web page 116 that has a particular URL.

The server 112 depicted in FIG. 1 may be implemented using one or more servers operating in response to a computer program stored in a storage medium accessible by the server 112. The server 112 may operate as a network server (e.g., a web server) to communicate with the user systems 102 and 104. The server 112 handles sending and receiving information to and from the user systems 102 and 104 and can perform associated tasks. The server 112 may also include firewalls to prevent unauthorized access and enforce any limitations on authorized access. For instance, an administrator may have access to the entire system and have authority to modify portions of the system. A firewall may be implemented using conventional hardware and/or software as is known in the art.

The server 112 may also include a storage database 114. The storage database 114 may be part of the server 112 as shown or may be a standalone unit. In one embodiment, the server may store metadata associated with the web page 116. In one embodiment, the metadata associated with the web page may be stored in a manner that the server is not given the URL for the web page. In one embodiment, the URL may form the basis for a key into the database 114. In a particular embodiment, the URL for the web page 116 is processed by the submission application 106 by applying a cryptographic hash function to the URL of the web page 116. In another particular embodiment, a cryptographic hash function is applied to the URL of the web page 116 and the result is truncated to a fixed number of characters. Regardless, the result of a cryptographic hash function performed on the URL or a substring thereof may serve as a key into the storage database. That is, the result of the cryptographic hash function or a substring thereof may become the identifier for the web page 116 in the storage database 114.

The storage database 114 depicted in FIG. 1 may be implemented using a variety of devices for storing electronic information. It is understood that the storage database 114 may be implemented using memory contained in server 112 or it may be a separate physical device. The storage database 114 is logically addressable as a consolidated data source across a distributed environment that includes a network 118. The physical data may be located in a variety of geographic locations depending on application and access requirements. Information stored in the storage database 114 may be retrieved and manipulated via the server 112. In one embodiment, the storage database contains metadata related to the web page 116. Of course, the storage database 114 could contain metadata related to many web pages. In one embodiment, the storage database accesses information related to a web page of interest utilizing a database key that is the result of a cryptographic hash function performed on the URL address of the web page of interest. That is, rather than in prior art where metadata was stored in a database and identified by the URL of the web page to which it related, in embodiments of the present invention, the metadata is stored based on a result of applying a cryptographic hash function to the URL address. In this manner, the server 112 and the storage database 114 may never be explicitly alerted to the actual URL of the web page to which the metadata applies, thus, preserving user privacy and confidentiality. In a particular embodiment, the metadata may be annotations to the web page 116.

According to one embodiment of the present invention as applied to a web page annotation system, the system 100 may operate as follows. The first user system 102 may load the web page 116. Utilizing an application that enables annotation to websites as the submission application 106 the first user system 102 may allow an operator of the first user system 102 to place annotations on certain portions of the web page 116 as it is displayed on a display device that may be part of the first user system 102. These annotations, in some embodiments, may be stored in such a manner that the annotation may be reproduced based on contextual information stored with them. The contextual information could include, for example, fragment identifiers, dates, and permalinks to the website 116. In one embodiment, the first submission application 106 applies a cryptographic hash function to the URL to create a database key. The database key and the annotations associated with the web page are then passed, via the communications network 118, to the server 112. The server 112 stores the received information in the database 114. In one embodiment, the information received from the first user system 102 is stored in the database 114 such that the annotations are stored at a location that is indexed by the result of a cryptographic hash function performed on the URL of the web page 116 to which the annotations are associated.

At a later time, the second user system 104 may request, via the second receiving application 111, the annotations related to the web page 116. This may be accomplished by loading the web page 116 into the browser on the second user system 104 and letting the receiving application 112 request (automatically or for instance by a button provided by the receiving application 112), the annotations associated with the web page 116 that are stored in the storage database 114. The act of requesting may include applying a cryptographic hash function to the URL address for the web page 116. The result of the cryptographic hash function is transmitted to the server 112 and utilized to access the annotations at the location indexed by the result in the database 114.

The above example, while not using the URL address of the web page 116 as the key to the storage database 114, may still have some deficiencies that may allow the server 112 to gain knowledge of the web page 116 to which the annotations are related. First, the server 112 or other computing device could perform a dictionary or brute force attack on the keys stored in the storage database 114. The "dictionary" for such an attack could be, for instance, a list of all possible web page URL's. Further, because the annotations may include contextual information from which the URL of the web page 116 may be determined.

To overcome some or all of the possible deficiencies described in the preceding paragraph, other steps may be performed by the submission application 102 to further mask to the URL to which the annotations are related. For instance, only a portion of the result of performing a hash function on the URL may be used as the database key. In this manner, the likelihood that multiple URL's may produce the same result from the hash function is increased. Thus, a dictionary attack may produce multiple possible URL addresses that create the same database key. In some instances, however, it may be desirable for the second user system 104 to be able to determine, based on receiving multiple possible records received from the server 112, which is the desired web page. To this end, aspects of the present invention may also calculate several other values that are stored with the annotation. For instance, a transformation of the URL (T) may be calculated, an encryption key (K) may be provided, and an encrypted version (C) of the context may be generated, and all of these values stored with the annotations in the storage database 114.

Figure 2:
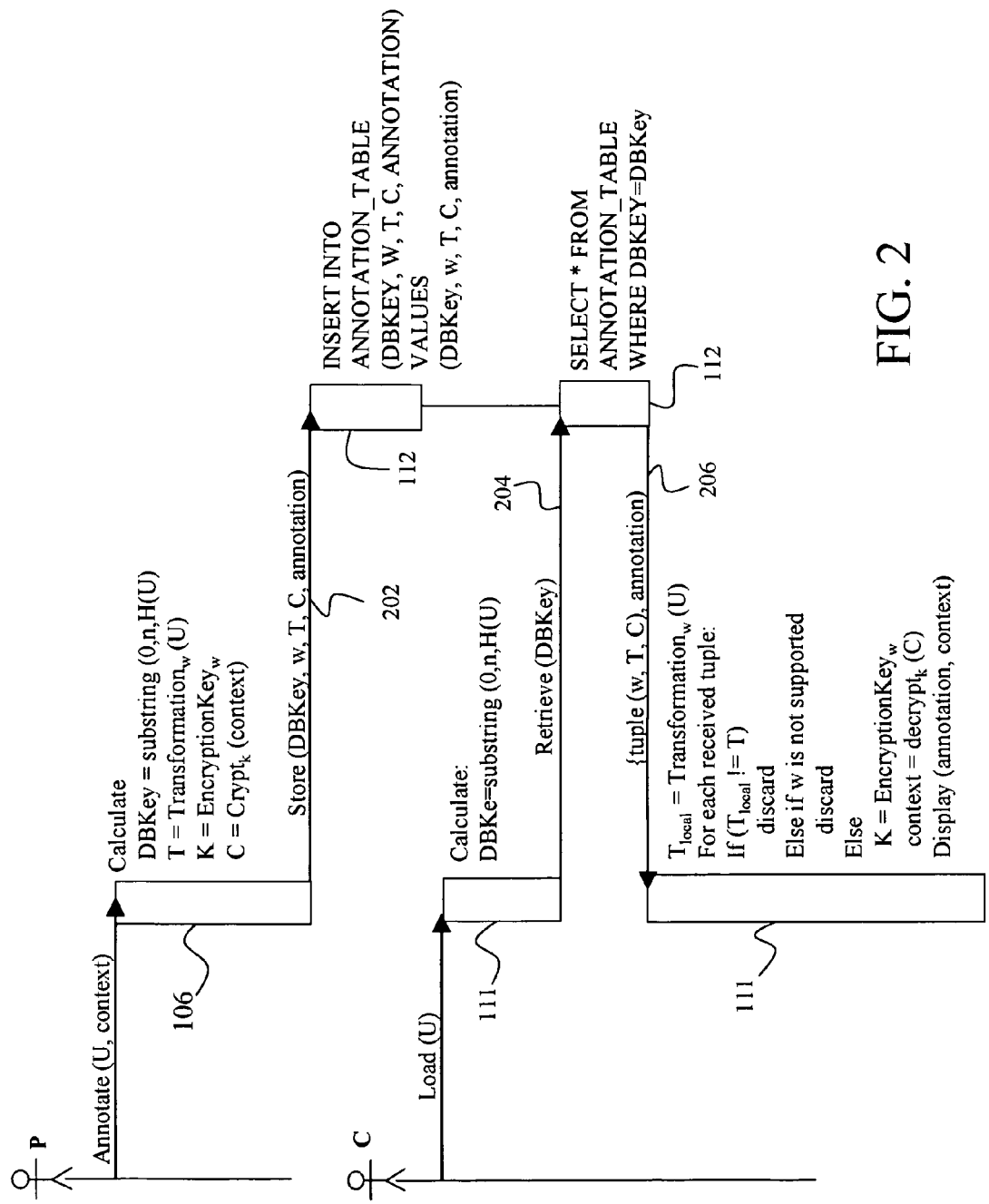
FIG. 2 is a data flow diagram showing a method according to the present invention.

FIG. 2 depicts a dataflow diagram according to one embodiment of the present invention. A user P may select a web page 116 and create annotations on it at the first user system 102. The first submission application 106 receives the annotations, the URL (U) and the context information associated with the web page 116. The first submission application 106 may then calculate one or more of the following values: a database key (DBKey); a transformation of the URL (T); an encryption key (K) and an encrypted version (C) of the context information.

In particular, DBKey may be calculated as a substring of the result of the cryptographic hash function performed on the URL address, a value identifying the size of the substring of the hash value of the URL (H(U)). That is, DBKey may equal substring (0, n, H(U)).

The transformation of the URL (T) may equal Transformation$_w$(U) where w identifies the encoding scheme utilized in the transformation. Given that the present invention embodiment are directed toward obfuscating the URL stored by the server, the transformation used to generate T may be a non-reversible function such that it is impossible (or highly improbable) for the sever to determine the URL from it. This transformation, for example, may utilize a cryptographic hash function or an encryption scheme such as Advanced Encryption Scheme (AES) having an encryption key (K). In this embodiment, K may, therefore, equal the encryption key for the AES defined by the value w.

The encrypted version of the context (C) may simply be the encrypted version of the context. That is, C=Crypt$_K$(context) where K is the key to the particular encryption scheme used to encrypt the context information.

As shown in FIG. 2, a store command (indicated by data transfer line 202) is sent to the server 112. The store command, in one embodiment may include the DBKey, w, T, C, and the annotation information. In one embodiment, the store command may be represented as Store(DBKey, w, T, C, annotation).

The server 112 may receive the store command 202 and cause the information to be stored in the storage database 112 (not shown). In particular, the annotation information may be inserted into an annotation table or other storage construct at an open location and labeled DBKEY, where DBKEY=DBKey. In addition, the values w, T, and C may also be stored at this location. It will be understood that because DBKey is only a substring of the hashed URL, multiple locations may be labeled with the same value DBKEY. This may be desirable in that it creates hash value collisions and, thus, may serve to thwart or make more difficult a dictionary or brute force attack on the database to determine addresses of URL's visited by users who are storing annotation information in the database.

The second user system 104 may load the web page 116 in a conventional manner. Utilizing a command (triggered automatically or by e.g. pressing a button) provided by the second receiving application 111, the second user system 104 may be able to access the annotations stored in the storage database associated with the web page 116. For example, the second receiving application 111 may calculate a value of DBKey in the same manner or a similar manner as described above. The value of DBKey may be sent as a part of a retrieve command along data transfer line 204. The server 112 receives the retrieve command and locates all records where DBKEY equals DBKey. As indicated by data transfer line 206, all records that have the key DBKEY equal to DBKey are sent to the second receiving application 111. In one embodiment, the records may be sent as a list of tuples (w, T, C) and the annotations associated therewith.

In one embodiment, multiple records may be retrieved. In such an instance, the second receiving application 111 may perform various checks to ensure that the correct record is selected (or the correct records, as there may be several of them). For instance, the receiving application 111 may calculate a value $T_{local}$ which is the Transformation$_w$(U) and compare this with the value of T received for each record. If the values are not the same, the record is discarded. Then, if the record has not been discarded, it is determined if the encryption algorithm w is supported. If not the record is discarded. If it is, this two level check may be sufficient to ensure that the correct records have been received. At this point, the key K is used to decrypt the context information and, utilizing the context information, the annotations may be displayed on the web page in the right location.

As discussed above, there may exist various levels of encoding/encryption that may exist in embodiments of the present invention. For instance, users may wish to have various types of communities. A first community could be an open community. In such a community all who have the receiving application may be able to access the annotations. In such a community the encryption key KE may be calculated directly from a URL by adding a published constant value to the URL and performing a cryptographic hash function on it. In such a community, the transformation is simply the result of a hash function performed on the URL. Another type of community is a transparent community which is a defined community having a particular set of participants. In this type of community, the transformation may be represented as $AES_{KT}$(U) where the transformation key KT (as well as the encryption key KE) is a value known only to those in the community. Another type of community is a private community that is the same as a transparent community except that privacy between users in the community may be desired. In such a community, the transformation may be a hash of the transformation $AES_{KT}$(U) where the transformation key KT is known within the private community and the encryption key may be equal to the result of performing a cryptographic hash function on the concatenation of a well known constant, KT and the URL. Table 1 below shows an example of the values that may be used for transformations and encryption in various embodiments of the present invention. Of course, Table 1 is by way of example only and other values may be utilized.

TABLE 1

| Encoding Scheme W (Community) | Transformation | | Encryption | |
|---|---|---|---|---|
| | Algorithm | KT | Algorithm | KE |
| Plain | Id(U) | none | Id (context) | none |
| Open | H(U) | none | $AES_{KE}$(context) | H(constant + U) |
| Transparent | $AES_{KT}$(U) | KT | $AES_{KE}$(context) | KT |
| Private | H($AES_{KT}$(U)) | KT | $AES_{KE}$(context) | H(constant + KT + U) |

The invention has been described above with respect to annotations to a web page. The invention, however, is not limited to such usage and may be applied in many different contexts. For instance, embodiments of the present invention may be used in any context where information about a web page is associated with a particular web page.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of preserving privacy in a system where information is associated with an existing web page having an address, the method comprising:
   receiving at a server a store command from a first user system, the store command including at least a database key and information to be associated with the web page, wherein the database key was created by performing a cryptographic hash function on the address of the web page;
   storing the information at a location in an electronic storage database;
   associating the location with the database key;
   receiving at the server a retrieve command from a second user system that has accessed the web page, the retrieve command including the database key created by the second user system by performing a cryptographic hash function on the address of the web page;
   retrieving stored information from one or more locations in the electronic database associated with the database key; and
   transmitting the stored information from the server to the second user system;
   wherein transmitting includes transmitting a tuple that includes a transformed version of the address and a constant identifying a transformation that was applied to the transformed version of the address and an encrypted portion.

2. The method of claim 1, wherein the information includes encrypted context information.

3. The method of claim 1, wherein the database key is created by taking a portion of a result of performing the hash function of the address of the web page.

4. The method of claim 1, wherein the store command further includes a transformed version of the address.

5. The method of claim 4, wherein the store command further includes a constant that identifies a transformation that was applied to the transformed version of the address.

6. The method of claim 1, wherein transmitting includes transmitting a tuple and the information.

7. The method of claim 6, wherein the tuple includes a transformed version of the address.

8. The method of claim 1, wherein the encrypted portion is an encrypted version of context information associated with the information.

9. The method of claim 1, wherein the information to be associated with the web page are annotations to the web page.

* * * * *